May 14, 1963 M. J. HERMANET 3,089,369
AUTOMATIC TRIMMING AND SCRAPING DEVICE
Filed Sept. 21, 1960 4 Sheets-Sheet 1

MARVIN J. HERMANET
INVENTOR.
BY
ATTORNEYS

May 14, 1963 M. J. HERMANET 3,089,369
AUTOMATIC TRIMMING AND SCRAPING DEVICE
Filed Sept. 21, 1960 4 Sheets-Sheet 4

MARVIN J. HERMANET
INVENTOR.

BY
ATTORNEYS 3,089,369
AUTOMATIC TRIMMING AND SCRAPING DEVICE
Marvin J. Hermanet, Rochester, N.Y., assignor to Eastman Kodak Company, Rochester, N.Y., a corporation of New Jersey
Filed Sept. 21, 1960, Ser. No. 57,452
10 Claims. (Cl. 83—3)

This invention relates generally to splicers, and more specifically to an improved automatic trimming and scraping device for preparing film strips for splicing.

When the ends of two strips of motion-picture film or the like are spliced, the following sequence of operations is normally performed: (1) The ends of the film strips are trimmed square; (2) the emulsion coating is removed from a small area of one of the film strips; (3) a suitable cement is applied to the area from which the emulsion has been removed; (4) the base side (non-emulsion coated side) of the end of the other film strip is placed in superposed relation to the cement-covered area; (5) the two ends of the film strips are brought into engagement and held therein until the cement is set. In the photofinishing industry, particularly with respect to the small photofinisher, these operations are usually performed manually, which is time-consuming and costly. This is particularly true with respect to 8 mm. film where every processed roll must be slit and spliced. These disadvantages resulting from manually performing the splicing operations are substantially obviated by the improved automatic trimming and scraping device of this invention in which the trimming and scraping operations are automatically performed for the operator.

The primary object of the present invention is to provide an improved trimming and scraping device for automatically preparing the ends of two strips of film for splicing.

Another object of this invention is to provide an improved trimming and scraping device for automatically trimming the ends of two strips of film, removing the emulsion from an area of one of the film strips, and overlapping the end of the other film strip with the area from which the emulsion has been removed.

Still another object of this invention is to provide an improved trimming and scraping device for automatically preparing film for splicing that is of simple design and construction, thoroughly reliable and efficient in operation, and economical to manufacture.

Objects and advantages other than those set forth above will be apparent from the following description when read in connection with the accompanying drawings, in which.

Figure 1:
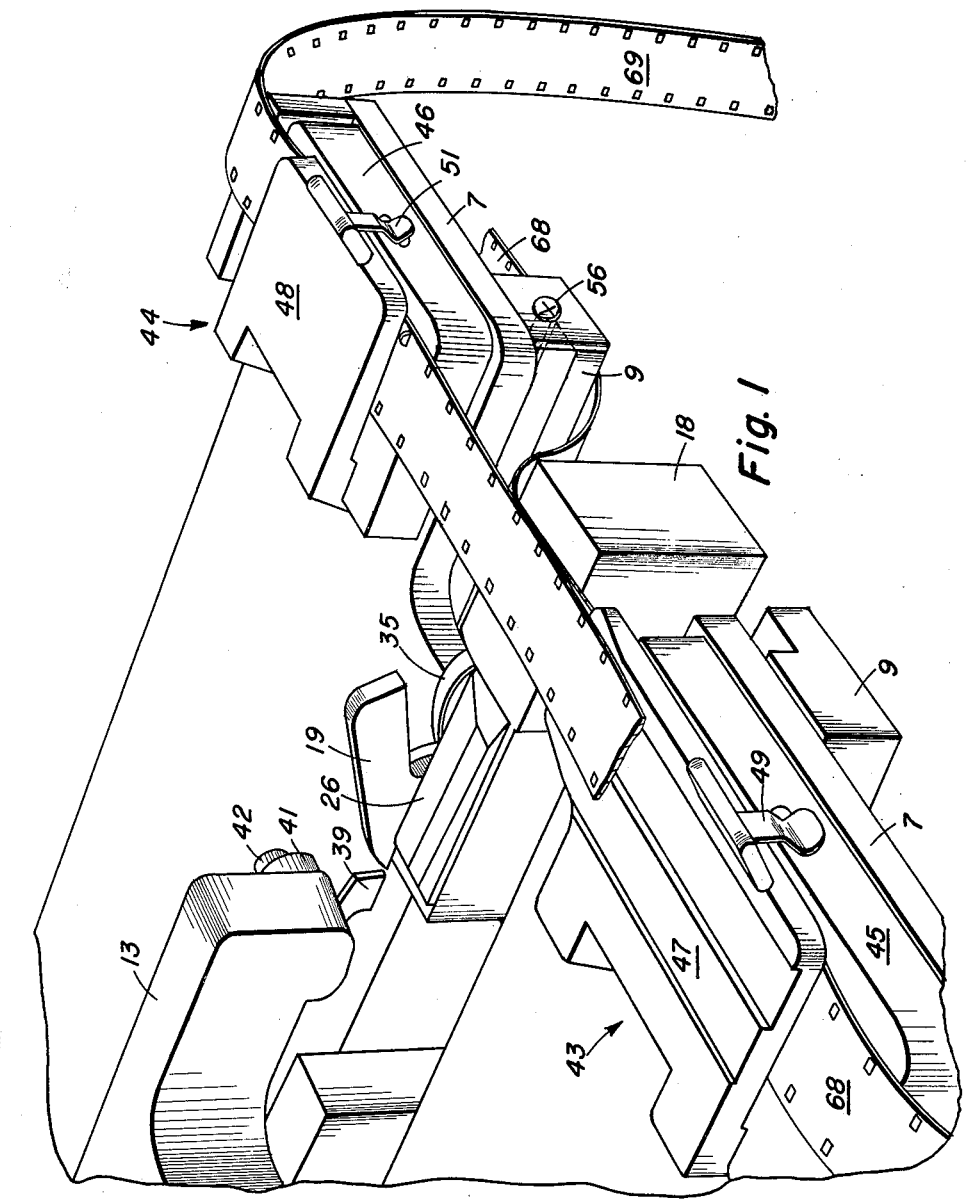
FIG. 1 is a segmental view in prespective of a trimming and scraping device, according to a preferred form of the invention, for automatically preparing film for splicing with the device in a "rest" position.
Figure 3:
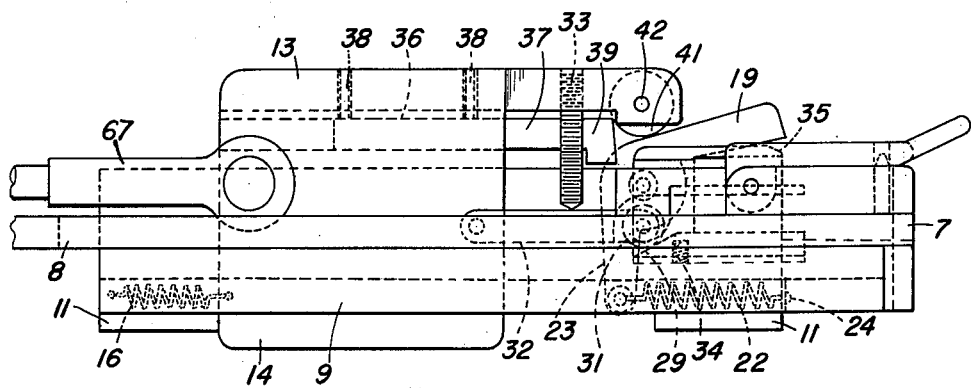
FIG. 3 is a segmental side elevation view of the trimming and scraping device.
Figure 4:
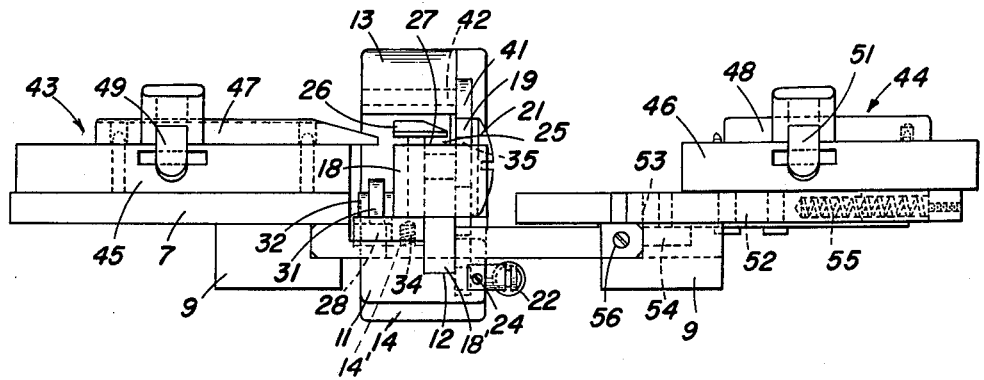
FIG. 4 is a front elevation view of the structure of FIG. 3.
Figure 5:
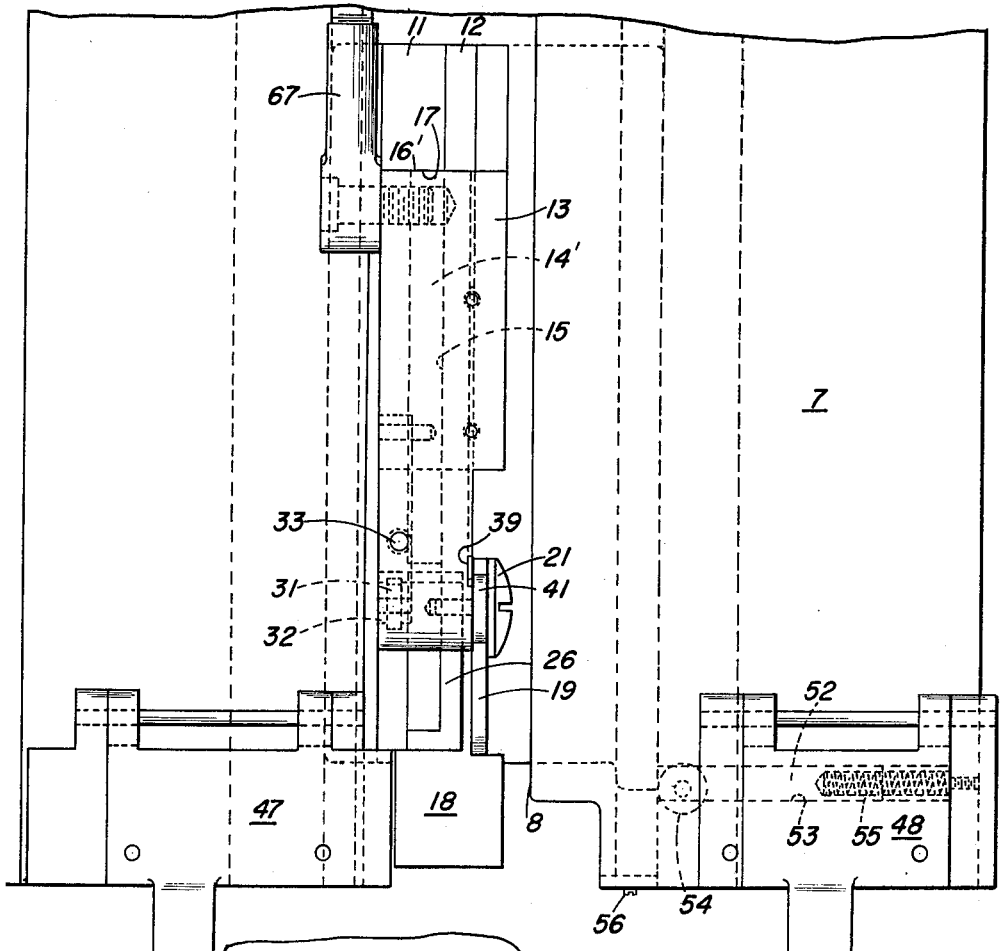
FIG. 5 is a top plan view of the structure of FIG. 3.

As shown in the drawings, the automatic trimming and scraping device of this preferred form of the invention comprises a base plate 7 mounted on some suitable support means, not shown, and having an elongated slot 8 extending inwardly from one end thereof as best seen in FIG. 5. A pair of spaced-apart ways 9, seen best in FIG. 4, is secured to the under side of plate 7 for slidably supporting a reciprocally movable slide carriage 11. The carriage 11 has a longitudinally extending slot 12, seen best in FIGS. 4 and 5, for slidably supporting the lower end of a support block 13 which is movable with respect to carriage 11. The support block 13 further has a projection 14' at its lower end as seen dotted in FIG. 5 extending through an elongated opening 15 in carriage 11, and one end of a spring 16 is secured to carriage 11 and the opposite end thereof secured to projection 14' for urging carriage 11 and support block 13 together with one end 16' of projection 14' engaging one end 17 of slot 15 as best seen in FIG. 5. A holding plate 14 is secured to projection 14' to retain block 13 on carriage 11. A mounting block 18 having a portion 18' thereof extending into slot 12 of carriage 11 is rigidly secured thereto by any suitable means. A knife blade 19 is pivotally mounted to the side of mounting block 18 by means of a screw 21, and cooperates with the side of block 18 to form a scissors for trimming the film. The knife blade 19 is urged into an inoperative position by a spring 22 as seen in FIG. 3 having one end secured to an arm 23 formed by knife blade 19, and its opposite end secured to the front end of carriage 11 by means of a screw 24. The mounting block 18 further supports a film clamping member 25 for vertical reciprocal movement, one end of clamping member 25 having a clamping head 26 spaced apart from the upper surface 27 of mounting block 13 a sufficient distance to permit clamping head 26 to pass over the filmstrips as slide carriage 11 is moved in a forward direction. The opposite end of film-clamping member 25 has a flange 28 having a ramp 29 which is engageable by a roller 31 mounted on one end of a lever 32 which is pivotally mounted to support block 13. A set screw 33 cooperates with lever 32 to limit the upward movement of lever 32 and roller 31. When support block 13 is moved relative to slide carriage 11, roller 31 engages ramp 29 and cams the ramp and clamping member 25 downwardly against the bias of a spring 34 causing clamping head 26 to clamp the filmstrips against surface 27 of mounting block 18. The clamping force exerted by clamping head 26 may be adjusted by varying the setting of setscrew 33. A film-lifting leaf spring 35 seen best in FIG. 1 is mounted on the side of mounting block 13 in register with knife blade 19 and in its uncompressed state extends above surface 27 of support block 13 a distance greater than the thickness of a filmstrip for urging the end of one of the trimmed film strips upwardly after knife blade 19 has been moved to its inoperative position following the completion of a trimming operation.

Figure 2:
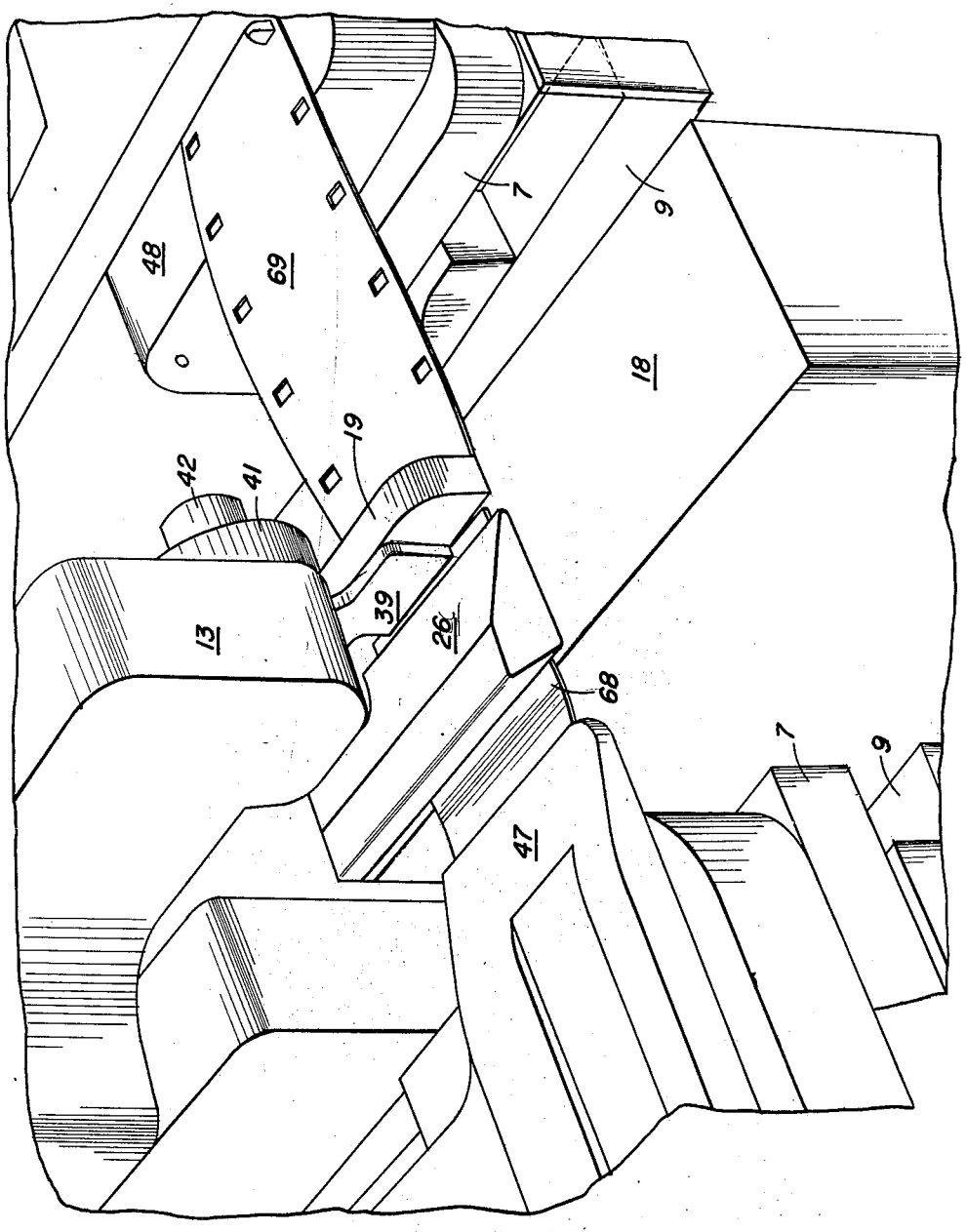
FIG. 2 is a view similar to FIG. 1 showing the device in a position trimming the two strips of film and removing the emulsion from one of the strips.

The support block 13 further has an elongated slot 36 along one side thereof for receiving the body portion of a scraping tool 37 which is secured to support block 13 by suitable adjusting screws 38. The end of scraping tool 37 forms a scraping edge 39 which is spaced above the upper surface of mounting block 18 a distance less than the thickness of a film, this distance being properly established by means of adjusting screws 38 and shims to equal the thickness of the emulsion on the filmstrip. When support block 13 is moved in a forward direction relative to slide carriage 11 and mounting block 18, cutting edge 39 passes across the end of the filmstrip clamped between clamping head 26 and mounting block 18 for removing the emulsion from the film. The scraping tool 37 is further properly mounted in support block 13 so that the outer edge of the tool is in register with the side of mounting block 18 so that tool 37 is in sliding engagement with the side of knife blade 19 as seen in FIGS. 2–4 removing the emulsion from the film along the trimmed end of the film. The width of the strip of emulsion removed from the film end is equal to the thickness of scraping edge 39, and determines the amount of overlap of one film end with respect to the other to form the splice. A width of 0.1 inch for scraping edge 39, and hence for the area removed along the film end, has been found to work very satisfactorily. The support block 13 is further provided on one side of its front end with a roller 41 rotatably mounted on a spindle 42 carried thereby which is adapted upon forward movement of support block 13 with respect to slide carriage 11 and mounting block 18 to engage knife blade 19 and urge the blade in a clockwise direction as seen in FIG. 3 against the bias of its spring 22 from an inoperative position to an operative position in which it cooperates with the side of mounting block 18 to sever the overlapped filmstrips interposed therebetween. A pair of film clamping devices 43, 44 is mounted on the front end of base plate 7, and film clamps 43, 44 comprise respective lower film support members 45, 46 having projections adapted to engage the perforations in the film and respective upper pivotally mounted, spring-biased platens 47, 48 releasably secured to lower members 45, 46 by spring latches 49, 51. The lower member 46 has a projection 52 extending into an elongated slot 53 in base plate 7, and projection 52 has a roller 54 mounted on one end thereof. A spring 55 is interposed between base plate 7 and projection 52 for laterally urging lower member 46 toward support block 13 until projection 52 engages one end of slot 53. In this position, roller 54 partly extends through way 9, and is engageable and movable by one of the arms of slide carriage 11 as best seen in FIG. 4. Any suitable adjustment means may be provided, not shown, for varying the distance roller 54 extends into way 9; this distance normally being maintained equal to the width of the emulsion scraped off of the film end. The front end of base plate 7 is provided with an adjusting screw 56 engageable by slide carriage 11 for providing a stop therefor. The screw 56 is properly adjusted so that slide carriage 11 can be moved a sufficient distance in a forward direction to cause clamping head 26 to pass over the full width of the filmstrip, and knife blade 19 to be properly positioned so that upon movement from its inoperative position to its operative position it will trim off the ends of the overlapped strips of film.

Figure 6:
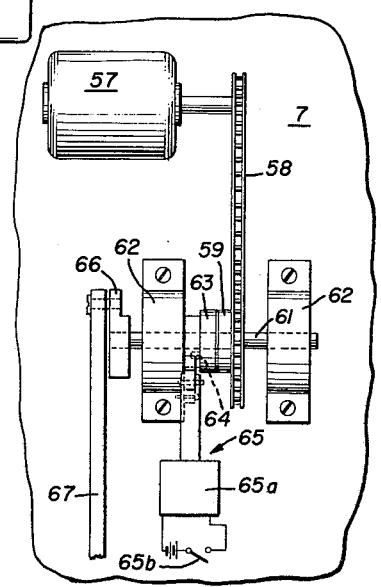
FIG. 6 is a top plan view of a drive mechanism for the automatic trimming and scraping device.

The drive mechanism for the automatic trimming and scraping device as best seen in FIG. 6 comprises an electric motor 57 mounted on plate 7 and drivingly connected by a chain 58 to a rotatable clutch driving element 59 rotatably mounted on a shaft 61 which is journaled in spaced-apart bearings 62. A spring clutch, not shown, of the normal type adapted to grip shaft 61 when turned in one direction, and to release shaft 61 when turned in the opposite direction is interposed between clutch driving element 59 and a clutch-driven element 63 secured to shaft 61, and has one end secured to element 63. The clutch-driven element 63 has a pin 64 engageable by a latch 65 under the control of solenoid 65a, which in turn is controlled by switch 65b. When latch 65 holds pin 64, the spring clutch is prevented from constricting, and clutch-driving element 59 rotates without driving driven element 63. When the solenoid is electrically actuated withdrawing latch 65 from pin 64, the spring clutch is released and constricts causing driving element 59 to drive driven element 63. A crank 66 is secured to one end of shaft 61 and has one end of a connecting rod 67 secured thereto, the opposite end of connecting rod 67 being secured to support block 13 as seen in FIG. 5.

In the operation of this invention, let us assume that the automatic trimming and scraping device is in its rest position with drive motor 57 operating and latch 65 in its engaged position for disconnecting motor 57 from shaft 61 and crank 66. In this position as seen in FIG. 5, slide carriage 11 is at one end of its travel and clamping head 26, knife blade 19 and scraping tool 37 are in their inoperative positions. The operator then places one film strip 68 in film clamp 43 with its free end extending underneath film clamp 44 and base plate 7, and the other film strip 69 in film clamp 44 with its free end extending over platen 47 as seen in FIG. 1. To automatically trim the ends of the overlapped filmstrips 68, 69 and remove the emulsion from the end of film 68 in preparation for a splice, the operator momentarily energizes solenoid operated latch 65 by actuating switch 65b, thus momentarily releasing the latch and causing drive motor 57 to rotate crank 66 through a single revolution at which time pin 64 is once again engaged by latch 65 disconnecting motor 57 from shaft 61. During the initial angular movement of crank 66, slide carriage 11 and support block 13 are moved as a unit in a forward direction until slide carriage 11 engages stop 56. During its movement, slide carriage 11 engages roller 54 and cams roller 54 and film clamp 44 outwardly or away from mounting block 15 a predetermined distance equal to the width of scraping tool 37. In this stopped position, clamping head 26 overlaps the superposed filmstrips 68, 69. Further angular movement of crank 66 causes support block 13 to be moved in a forward direction relative to slide carriage 11 and mounting block 18 causing roller 31 to cam clamping head 26 into its operative or clamping position, and roller 41 to engage and urge knife blade 19 from its inoperative position to its operative position for trimming off both ends of the superposed filmstrips 68, 69. Upon further angular movement of crank 66, scraping tool 37 is moved across the end of filmstrip 68 removing the emulsion therefrom; the width of the emulsion removed being equal to the width of tool 37. Upon further angular movement of crank 66, support block 13 is withdrawn relative to slide carriage 11 and mounting block 18 by means of its spring 16 releasing clamping head 26 and knife blade 19 which moves to their inoperative positions, and further withdrawing scraping tool 37 from filmstrip 68. As soon as knife blade 19 is moved into its inoperative position, lifter spring 35 lifts up the end of filmstrip 69 resting thereon a distance greater than the thickness of the film. As crank 66 completes its single rotation, slide carriage 11 and support block 13 are moved as a unit back to their rest position. As slide carriage 11 is withdrawn, film clamp 44 is moved inwardly by its spring 55 a distance equal to the width of the emulsion removed from film strip 68 for properly positioning the film ends of filmstrips 68, 69 in an overlapped, splicing position. All the operator now has to do is place cement on the scraped end of film strip 68, urge the end of film strip 69 in contact therewith by any suitable means, and hold the film ends together for the required time to complete the splice.

The invention has been described in detail with particular reference to a preferred embodiment thereof, but it will be understood that variations and modifications can be effected within the spirit and scope of the invention as described hereinabove and as defined in the appended claims.

I claim:

1. In an automatic trimming and scraping device for preparing two film strips for splicing; the combination with means for supporting two film strips with their ends aligned and in superposed relation, of a slidable carriage movable relative to said supported film strips between a start position and a stop position wherein it supports a portion of the superposed films; film cutting means movably carried by said carriage; a support member slidably mounted on said carriage and movable with said carriage from said start position to said stop position and then movable relative to said carriage from said stop position to an end position transversely of said supported film strips; resilient means for urging said member and carriage into engagement with one another; a scraping tool and a cam carried by said support member, said cam adapted to actuate said film cutting means upon movement of said support member from said stop position to said end position; and drive means for moving said support member and carriage as a unit from said start position to said stop position, and then moving said support member against the bias of said resilient means to said end position whereby said cam actuates said cutting means to trim off the superposed film strips and said scraping tool scrapes the emulsion off of one end of one of the film strips.

2. The invention according to claim 1 wherein said carriage supports a film clamping member movable between a normal open position and a closed position for clamping said film strips to said carriage, and adapted to be moved over said superposed film strips when said carriage is moved to its stop position, and a projection carried by said support member adapted to engage and move said film clamping member to said closed position when said support member is moved to its end position.

3. The invention according to claim 2 wherein said film clamping member has a ramp portion, and said projection comprises a roller adapted to engage said ramp and cam said film clamping member into its closed position when said support member is moved from said stop position to said end position.

4. The invention according to claim 1 wherein said cutting means includes a knife pivotally mounted on said carriage and cooperating with a side of said carriage to form a scissors, said knife being movable between a normal inoperative position and an operative position for severing the film strips, and said cam comprises a roller adapted to engage said knife and move said knife to its operative position severing said film strips when said support member is moved from said stop position to said end position.

5. The invention according to claim 4 wherein a lifter spring is mounted on the side of said carriage in alignment with said knife and below one of said film strips and is depressed thereby upon movement of said knife into its operative position, said spring adapted to engage said one film strip and lift it above the other film strip when said knife is moved to its inoperative position.

6. In an automatic trimming and scraping device for preparing film strips for splicing, the combination comprising: a base; a pair of film clamps mounted on said base for supporting said film strips with their ends aligned and superposed, one of said film clamps secured to said base and the other film clamp slidably mounted thereon for lateral movement from a normal first position to a second position for moving one film strip longitudinally with respect to the other film strip a distance equal to the width of a desired splice; a carriage slidably supported by said base for movement transversely of said supported film strips between a start position and a stop position wherein it supports a portion of the superposed films and adapted to engage and move said other film clamp to its second position upon movement to its stop position; a cutting means carried by said carriage; a support member slidably mounted on said carriage and movable with said carriage from said start position to said stop position and then movable relative to said carriage from said stop position to an end position; resilient means for urging said member and carriage into engagement with one another; a scraping tool and a cam carried by said support member, said cam adapted to actuate said film cutting means upon movement of said support member from said stop position to said end position; and drive means for moving said support member and carriage as a unit from said start position to said stop position during which said other film clamp is moved to its second position, and then moving said support member against the bias of said resilient means to said end position whereby said cam actuates said cutting means to trim off the superposed film strips, and said scraping tool scrapes the emulsion off of one end of one of the film strips, said support member and carriage when returned to said start position by said drive means permitting said other film clamp to return to its normal first position whereby the ends of said film strips are positioned in superposed relation for splicing.

7. The invention according to claim 6 wherein said carriage supports a film clamping member movable between a normal open position and a closed position for clamping said film strips to said carriage, and adapted to be moved over said superposed film strips when said carriage is moved to its stop position, and a projection carried by said support member adapted to engage and move said film clamping member to said closed position when said support member is moved to its end position.

8. The invention according to claim 7 wherein said film clamping member has a ramp portion, and said projection comprises a roller adapted to engage said ramp and cam said film clamping member into its closed position when said support member is moved from said stop position to said end position.

9. The invention according to claim 6 wherein said cutting means comprises a knife pivotally mounted on said carriage, said knife cooperating with a side of said carriage to form a scissors, and is movable between a normal inoperative position and an operative position for severing the film strips, and said cam comprises a roller adapted to engage said knife and move said knife to its operative position severing said film strips when said support member is moved from said stop position to said end position.

10. The invention according to claim 9 wherein a lifter spring is mounted on the side of said carriage in alignment with said knife and below one of said film strips and is depressed thereby upon movement of said knife into its operative position, said spring adapted to engage said one film strip and lift it above the other film strip when said knife is moved to its inoperative position.

References Cited in the file of this patent

UNITED STATES PATENTS

| | | |
|---|---|---|
| 811,940 | Marston et al. | Feb. 6, 1906 |
| 1,734,141 | McLaughlin et al. | Nov. 5, 1929 |
| 1,934,417 | Franzen et al. | Nov. 7, 1933 |
| 2,518,927 | Ordman et al. | Aug. 15, 1950 |
| 2,541,545 | Rickert et al. | Feb. 13, 1951 |
| 2,721,602 | Castedello et al. | Oct. 25, 1955 |